United States Patent
Silvery

(10) Patent No.: US 12,199,477 B2
(45) Date of Patent: Jan. 14, 2025

(54) SENSOR-FASTENING MEANS FOR MEASURING TEMPERATURE IN AN ELECTRIC MACHINE OF A MOTOR VEHICLE

(71) Applicant: Schaeffler Technologies AG & Co. KG, Herzogenaurach (DE)

(72) Inventor: Christian Silvery, Walzbachtal (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 307 days.

(21) Appl. No.: 17/640,907

(22) PCT Filed: Jun. 10, 2020

(86) PCT No.: PCT/DE2020/100485
§ 371 (c)(1),
(2) Date: Mar. 7, 2022

(87) PCT Pub. No.: WO2021/047709
PCT Pub. Date: Mar. 18, 2021

(65) Prior Publication Data
US 2022/0263387 A1 Aug. 18, 2022

(30) Foreign Application Priority Data
Sep. 9, 2019 (DE) ...................... 10 2019 124 035.2

(51) Int. Cl.
*H02K 11/25* (2016.01)
(52) U.S. Cl.
CPC ................... *H02K 11/25* (2016.01)

(58) Field of Classification Search
CPC ....................................................... H02K 11/25
See application file for complete search history.

(56) References Cited

FOREIGN PATENT DOCUMENTS

| CN | 102255441 A | 11/2011 |
|---|---|---|
| CN | 104682627 A | 6/2015 |
| CN | 107209062 A | 9/2017 |

(Continued)

*Primary Examiner* — Forrest M Phillips
(74) *Attorney, Agent, or Firm* — Volpe Koenig

(57) ABSTRACT

A sensor-fastening means is disclosed for measuring temperature in an electric machine for the drive of a motor vehicle, having a retaining body for accommodating a temperature sensor, having a metal retaining plate, which is fastened to the retaining body and is intended for fastening to the electric machine in a defined installation position relative to the electric machine. In the installation position, the temperature sensor is oriented substantially in the radial direction of the electric machine, and has a spring element, which is supported on the retaining body and is intended for providing spring prestressing in the axial direction for the purpose of pressing the temperature sensor against a radially inner edge of a winding. The sensor-fastening means, which can be displaced in the radial direction and can be moved axially past the winding, makes it possible for the temperature sensor to be positioned on the radially inner edge of the winding from the radially outward direction and to be thermally coupled thereto with the aid of the spring element, therefore allowing easy-to-maintain and accurate measurement of a maximum temperature in a winding of an electric machine for a motor vehicle.

12 Claims, 3 Drawing Sheets

(56) References Cited

FOREIGN PATENT DOCUMENTS

| CN | 107546924 A | 1/2018 | |
|---|---|---|---|
| CN | 108474699 A | 8/2018 | |
| DE | 102011084229 A1 * | 4/2013 | ............ H02K 11/25 |
| DE | 102015200089 A1 | 7/2016 | |
| DE | 102015222720 A1 | 5/2017 | |
| JP | 2003092858 A | 3/2003 | |
| JP | 2009100538 A | 5/2009 | |
| JP | P2009100538 A | 5/2009 | |
| WO | WO-2016120929 A1 * | 8/2016 | ............... G01K 1/14 |
| WO | 2019030110 A1 | 2/2019 | |
| WO | 2019063207 A1 | 4/2019 | |
| WO | WO-2019087568 A1 * | 5/2019 | ............ H02K 11/21 |
| WO | WO-2019187570 A1 * | 10/2019 | ............... G01K 1/14 |

* cited by examiner

SENSOR-FASTENING MEANS FOR MEASURING TEMPERATURE IN AN ELECTRIC MACHINE OF A MOTOR VEHICLE

CROSS-REFERENCE TO RELATED APPLICATIONS

This application is the U.S. National Phase of PCT Appln. No. PCT/DE2020/100485 filed Jun. 10, 2020, which claims priority to DE 10 2019 124 035.2 filed Sep. 9, 2019, the entire disclosures of which are incorporated by reference herein.

TECHNICAL FIELD

The disclosure relates to a sensor fastening means, through which a temperature sensor can be fastened in an electric machine of a motor vehicle in order to measure a temperature occurring in the electric machine.

BACKGROUND

Temperature sensors are used in electric machines, for example, to monitor the temperature of individual components. Particularly in electric machines used for driving a motor vehicle, temperatures of stator and rotor components must be monitored. In electric machines with distributed windings, but also in machines with single-tooth windings, the temperature sensors are usually installed inside the stator, where they are, however, no longer accessible from the outside for maintenance purposes. For electric machines, especially for electric hybrid vehicles as well as for electric vehicles or for wheel hub drives, different winding technologies for the stator of the electric machines are known. For a particularly dense or compact winding, for example, winding technologies such as the so-called hairpin or bar wave winding are used. It is difficult to measure the temperature of such windings because they are very tightly wound or assembled, so that no temperature sensor can be inserted between the wires of the respective winding in order to measure the temperature of the winding. In this case, the temperature of the winding is measured at the radial outer side, where, however, lower temperatures occur than on the radial inner edge of the winding, so that a too low maximum temperature of the winding is measured.

SUMMARY

It is the object of the disclosure to disclose measures allowing easy-to-maintain and accurate measurement of a maximum temperature in a winding of an electric machine for a motor vehicle.

According to the disclosure, the object is achieved by a sensor fastening means having the features described herein. Preferred embodiments of the disclosure are specified in the following description, each of which can either individually or in combination represent an aspect of the disclosure.

According to the disclosure, a sensor-fastening means is provided for measuring temperature in an electric machine for the drive of a motor vehicle, having a retaining body for accommodating a temperature sensor, having a metal retaining plate, which is fastened to the retaining body and is intended for fastening to the electric machine in a defined installation position relative to the electric machine, wherein, in the installation position, the temperature sensor is oriented substantially in the radial direction of the electric machine, and having a spring element, which is supported on the retaining body and is intended for providing spring prestressing in the axial direction for the purpose of pressing the temperature sensor against a radially inner edge of a winding.

With the aid of the sensor fastening means, the temperature sensor can be guided in the axial direction past the winding to be monitored, so that it is possible to insert the sensor fastening means into the electric machine from the radial outside and to remove it again from the radial outside for maintenance purposes without the winding being able to block a radial relative movement. An impact of the temperature sensor or the sensor fastening means on the winding in the radial direction can be avoided. With the aid of the leaf spring, the retaining body can be prestressed in the axial direction together with the temperature sensor. For this purpose, the leaf spring can be supported on the rear side of the retaining body pointing away from the temperature sensor and pointing in the axial direction of the electric machine on the one hand, and on an upper side of a stator lamination of the stator of the electric machine running axially next to the winding in a radial plane on the other hand. The spring element can thus press the retaining body together with the temperature sensor away from the stator lamination towards the winding. The spring element that springs back in the axial direction of the electric machine can be compressed during assembly in order to move the temperature sensor together with the sensor fastening means axially along the winding from the radial outside. When the desired radial position relative to the winding has been reached, the compressed spring element can relax and press the temperature sensor against the winding with a remaining prestressing force. In this case, the temperature sensor can be pressed in particular against the radially inner edge of the winding, where the highest temperatures are to be expected. Between the axial edge of the winding, against which the temperature sensor is pressed, and an inner wire region of the winding which is central in the axial direction, a heat transfer, which is essentially dominated only by thermal conduction, occurs and which can either be taken into account by calculation in the temperature measurement in a monitoring unit connected to the temperature sensor or can even be neglected. The sensor fastening means can be fixed in the axial relative position that results after the relaxation of the spring element, in particular fastened to the sensor plate. The knowledge can also be exploited that the retaining body is usually made of an electrically insulating plastic material that can be bent somewhat by the spring force applied by the spring element to ensure thermal contact of the temperature sensor with the radially inner edge of the winding. Through the sensor fastening means, which can be shifted in the radial direction and can be moved past the winding axially, the temperature sensor can be positioned, from the radial outside, on the radially inner edge of the winding and can be thermally coupled through the spring element therefore allowing easy-to-maintain and accurate measurement of a maximum temperature in a winding of an electric machine for a motor vehicle.

In particular, the electric machine is designed to feed a drive power into a drive train of the motor vehicle for driving a motor vehicle in motor operation or to drive an individual wheel of the motor vehicle as part of a wheel hub drive. In a generator operation of the electric machine, drag torques acting on the electric machine can be used to generate electrical energy. The electric machine has a stationary stator and a rotor rotating relative to the stator. The rotor can have permanent magnets that can electromagnetically interact with electromagnets of the stator to exchange torque during motor operation and/or generator operation. The stator can have at least one stator lamination covering the winding of the stator on one axial side. The winding can be electrically insulated from the stator lamination by insulation elements. In particular, the sensor fastening means can be inserted in an intermediate space formed between the stator lamination and the winding in an insulation layer containing the insulation elements. In particular, the winding is based on a coil winding technology that allows for high power density and high energy efficiency. Preferably, the winding is based on a hairpin or bar wave winding. In the case of bar wave winding, the winding, in particular distributed winding, can be created in a kind of braiding process and then joined in the stator slots. This makes it possible to work with smaller cross sections, to increase the possible number of slots and/or to reduce the effect of current displacement losses. The mounting position of the sensor fastener corresponds in particular to a relative position of the sensor fastener within the electric machine, in which the sensor fastener is to be installed together with the temperature sensor, in which the temperature sensor is essentially oriented in the radial direction of the electric machine and in its designated end position on the winding, in particular on the radially inner edge of the winding.

In particular, the temperature sensor is accommodated in the retaining body so that it cannot move, in particular in the axial and tangential direction. The retaining body can block a relative movement of the temperature sensor to the sensor fastening means in the axial and tangential direction of the electric machine in a form-fitting and/or friction-fitting manner. This can prevent the temperature sensor from being displaced when the sensor fastening means is installed in the electric machine and from measuring the temperature at the wrong point on the winding. Even if the temperature sensor impacts the winding during assembly, the temperature sensor remains in the desired relative position within the retaining body, so that the intended temperature measuring point on the inner edge of the winding can be reached with a high degree of accuracy.

The spring element is preferably designed in one piece with the retaining plate. The required installation space and manufacturing costs can thus be reduced. The spring element can be made, for example, from a metal sheet that can spring elastically at least in the region of the spring element in order to provide the spring properties of the spring element.

The spring element is particularly preferably designed as a leaf spring. The spring element, which is designed in particular in one piece with the retaining plate, can protrude from the radial plane of the electric machine in the axial direction of the electric machine at least in one portion in order to be supported on the stator lamination with a spring force. The contact pressure with which the temperature sensor can be pressed against the winding can be provided inexpensively by a measure that is simple in terms of design and production technology.

In particular, a free end of the spring element is accommodated in a receiving pocket of the retaining body so that it can be displaced relatively in the radial direction of the electric machine. The spring element designed as a leaf spring can have an essentially U-shaped intermediate area, via which the spring force can be applied in the axial direction of the electric machine. The spring element can be clamped on both sides, wherein the free end of the spring element inserted into the receiving pocket is able to follow an offset in the radial direction of the electric machine, which occurs when the U-shaped intermediate area is compressed, without blocking. At the other end, the spring element can be fixed to the retaining body and/or to the retaining plate so that it cannot move, in particular it can be designed in one piece with the retaining plate. The relative position and the spring prestressing of the spring element can be predetermined to a large extent by the retaining pocket.

The retaining body preferably has a receiving shaft for inserting the temperature sensor through a relative movement in the radial direction of the electric machine, wherein a cable shaft for accommodating electrical lines of the temperature sensor is directed at an angle, in particular substantially 90°±10°, away from the receiving shaft. Through the receiving shaft, the temperature sensor can be easily inserted into the sensor fastening means, wherein the receiving shaft can in particular block a relative movement of the temperature sensor relative to the sensor fastening means in the axial and tangential direction of the electric machine. If the temperature sensor has been inserted into the receiving shaft in the radial direction of the electric machine to such an extent that the temperature sensor has reached its designated end position, the electrical lines of the temperature sensor, via which the measurement signals of the temperature sensor can be routed to a monitoring unit, can be angled and inserted into the cable shaft. The electrical lines are particularly preferably clamped within the cable shaft, in particular in order to relieve strain on the electrical lines. The angled electrical lines, which are preferably clamped in the cable shaft, can block or at least minimize a relative movement of the temperature sensor within the receiving shaft in the radial direction of the electric machine. As a result, the temperature sensor can be accommodated in the sensor fastening means so that it cannot move.

Particularly preferably, the receiving shaft has a retaining pocket for receiving a free end of the temperature sensor, wherein in particular the retaining pocket blocks a relative movement of the temperature sensor to the retaining body in the axial and/or tangential direction of the electric machine. In particular, the free end of the temperature sensor is wedged in the retaining pocket. This minimizes the play of the temperature sensor in the receiving shaft. The free end of the temperature sensor inserted in the retaining pocket can reliably prevent the temperature sensor from being levered out of the receiving shaft even under load.

In particular, the retaining plate has at least one fastening opening for fastening to a stator lamination and/or for fastening to a machine mounting of the electric machine. In particular, two or more fastening openings are provided in order to prevent a rotation of the stator lamination. As a result, the retaining plate can easily be attached to the stator so that it cannot move. In this case, it is possible to provide at least one separate fastening opening in the stator lamination of the stator in order to screw the retaining plate to the stator lamination. It is also possible to provide an opening in the stator lamination for fastening the retaining plate which is already provided for fastening a plurality of stator laminations to one another and/or for fastening the electric machine to a mounting, so that no additional opening need be provided in the stator lamination and additional fastening means can be saved.

The retaining plate preferably has at least one angled projection for limiting a radial insertion depth and/or for preventing rotation. During a relative movement of the sensor fastening means together with the temperature sensor in the radial direction of the electric machine, the angled projection of the retaining plate can impact the stator lamination relative to the stator lamination in order to block further relative movement. In this case, the angled projection can have an extension which also blocks the retaining plate from rotating on the stator lamination. Preferably, at least two angled projections are provided spaced-apart from each other, which in particular impact the stator lamination in different directions. The stator lamination can be, for example, essentially rectangular in shape, so that at a corner of the stator lamination the sensor fastening means can be pushed radially into a gap between the winding and the stator lamination until the two different angled projections hit different sides of the stator lamination and prevent rotation of the sensor fastening means with a low material usage.

The disclosure further relates to a stator arrangement for an electric machine having at least one stator lamination, a winding for forming an electromagnet, insulation elements provided between the stator lamination and the winding and arranged spaced apart from one another in the circumferential direction for electrically insulating the winding with respect to the stator lamination, and a sensor fastening means fastened to the stator lamination, which can be designed and further developed as described above, wherein the temperature sensor accommodated in the retaining body extends substantially radially between two insulation elements following one another in the circumferential direction and is pressed in a thermally conductive manner against the winding, in particular a radially inner edge of the winding, by the spring element supported on the stator lamination. Through the sensor fastening means, which can be shifted in the radial direction and can be moved past the winding axially, the temperature sensor can be positioned, from the radial outside, on the radially inner edge of the winding and can be thermally coupled through the spring element therefore allowing easy-to-maintain and accurate measurement of a maximum temperature in a winding of an electric machine for a motor vehicle.

The disclosure also relates to an electric machine for electrically driving a motor vehicle with a stator assembly, which can be designed and developed as described above, and a rotor which can be coupled to a drive train of the motor vehicle and interacts with the electromagnets of the stator assembly. Through the sensor fastening means, which can be shifted in the radial direction and can be moved past the winding axially, the temperature sensor can be positioned, from the radial outside, on the radially inner edge of the winding and can be thermally coupled through the spring element therefore allowing easy-to-maintain and accurate measurement of a maximum temperature in a winding of an electric machine for a motor vehicle.

BRIEF DESCRIPTION OF THE DRAWINGS

In the following, the disclosure is explained by way of example with reference to the accompanying drawings using preferred exemplary embodiments, wherein the features shown below can represent an aspect of the disclosure both individually and in combination. In the figures.

DETAILED DESCRIPTION

Figure 1:
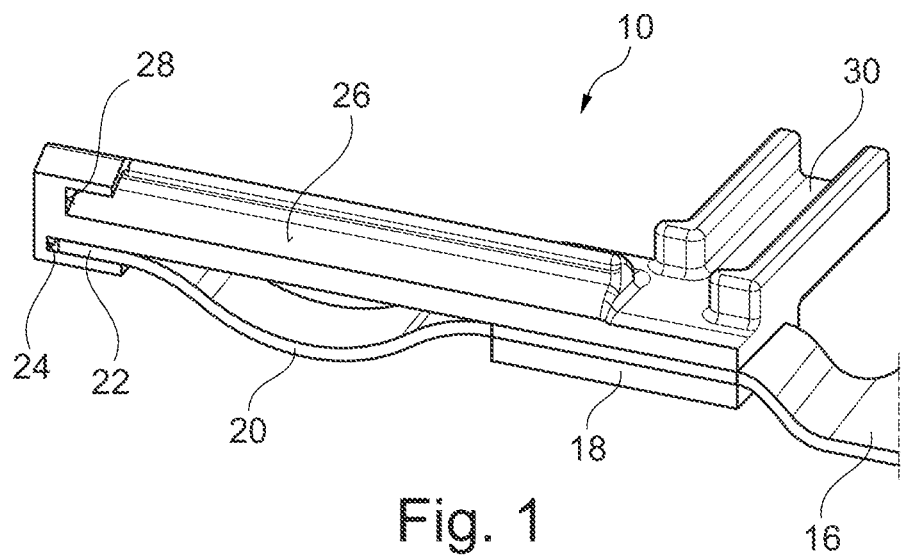
FIG. 1: shows a schematic perspective sectional view of part of a sensor fastening means.

The sensor fastening means 10 shown in FIG. 1 can be used for fastening a temperature sensor 12, in particular designed as an NTC or PTC resistor element, in an electric machine provided for driving a motor vehicle in order to be able to monitor the temperature of a winding 14 of electromagnets of a stator of the electric machine. The sensor fastening means 10 has a metal retaining plate 16 which is connected to a retaining body 18 made from an electrically insulating plastic material. For this purpose, for example, the retaining plate 16 can be overmolded in a portion by the retaining body 18. A spring element 20 designed as a leaf spring is integrally connected to the retaining plate 16 and can impart a prestressing force in the axial direction of the electric machine. A free end 22 of the spring element 20 designed as a leaf spring is accommodated in a receiving pocket 24, wherein the free end 22 is displaceable in the receiving pocket 24 to such an extent that an offset of the free end 22 can be compensated for when the U-shaped protruding portion of the spring element 20 is compressed within the receiving pocket 24. Upstream from the spring element 20, the retaining body 18 forms a receiving shaft 26 into which the temperature sensor 12 can be inserted in the longitudinal direction and which at the same time blocks a relative movement of the temperature sensor 12 transversely to the longitudinal direction in a form-fitting manner. When the sensor fastening means 10 is oriented with its longitudinal direction in the radial direction of the electric machine, relative movement of the temperature sensor 12 in the tangential and axial directions of the electric machine is blocked. A free end of the temperature sensor 12 can be inserted, preferably wedged, into a retaining pocket 28 formed at the end of the receiving shaft 26. In addition, a cable shaft 30 formed in one piece with the retaining body 18 is directed from the receiving shaft 26 essentially at right angles.

Figure 2:
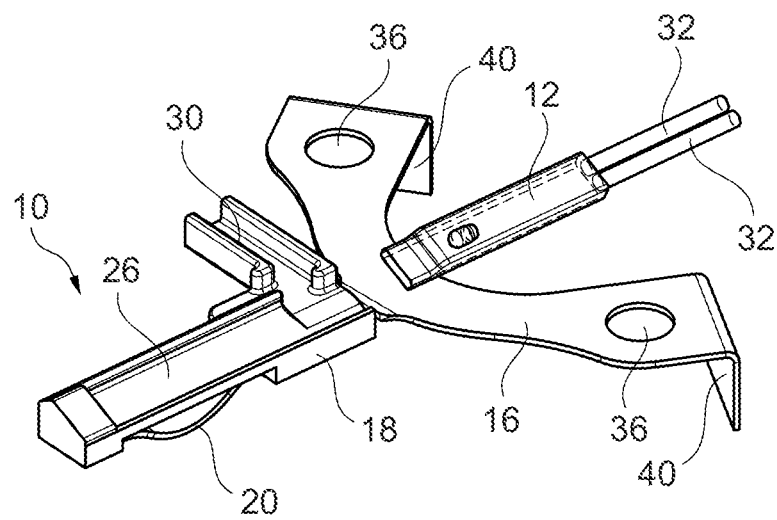
FIG. 2: shows a schematic perspective view of the sensor fastening means from FIG. 1 during the assembly of a temperature sensor.

As shown in FIG. 2, the temperature sensor 12 can be inserted into the receiving shaft 26 via a relative movement along the longitudinal direction of the receiving shaft 26. Electrical lines 32 connected to the temperature sensor 12 can protrude in the longitudinal direction on the rear side of the temperature sensor 12.

Figure 3:
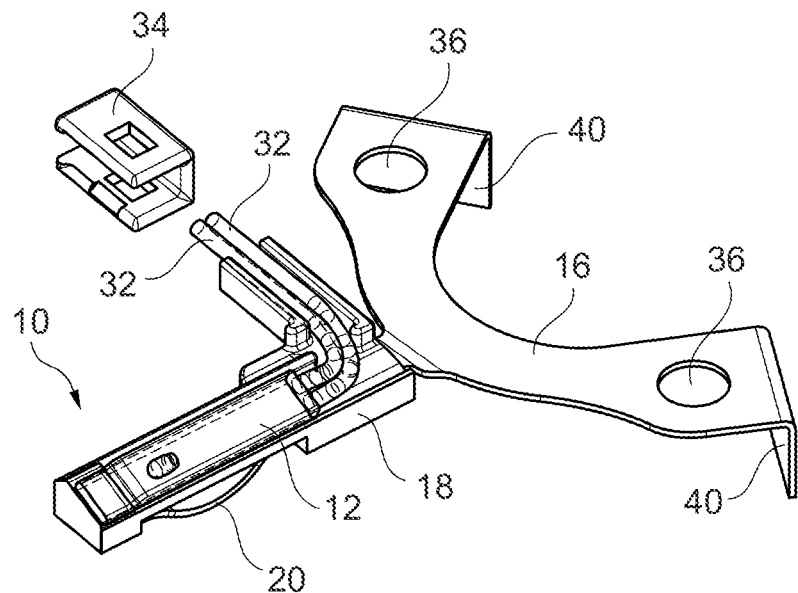
FIG. 3: shows a schematic perspective view of the sensor fastening means of FIG. 2 after assembly of the temperature sensor.

As illustrated in FIG. 3, after the temperature sensor 12 has reached its designated relative position within the receiving shaft 26 of the retaining body 18, the electrical lines 32 can be bent essentially at right angles and inserted into the cable shaft 30, in doing so enabling a relative movement of the temperature sensor 12 in the longitudinal direction of the receiving shaft 26 to be blocked by the electrical lines 32.

Figure 4:
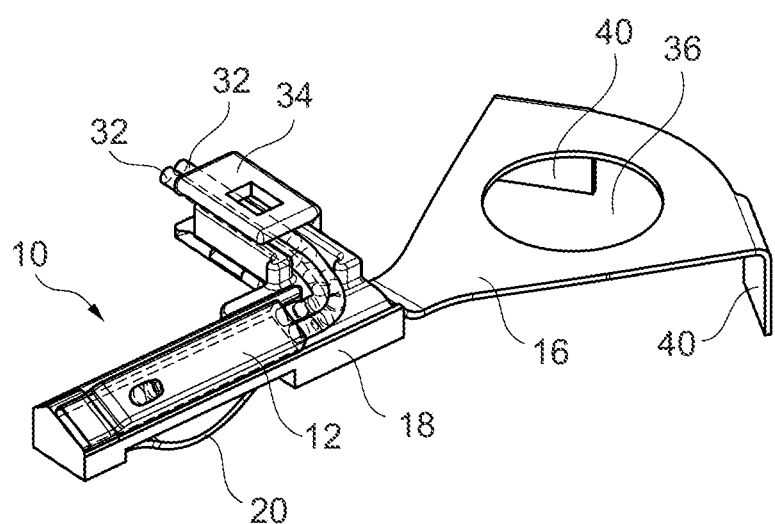
FIG. 4: shows a schematic perspective view of an alternative embodiment of a sensor fastening means with a fully assembled temperature sensor.

As shown in FIG. 4, the electrical lines 32 can be clamped with the aid of a clamping element 34, in doing so enabling strain to be relieved. The retaining plate 16 can have at least one fastening opening 36 in order to install the sensor fastening 10 together with the accommodated temperature sensor 12 in the electric machine. For this purpose, in particular, a plurality of fastening openings 36 can be provided, as shown in FIGS. 2 and 3, which can be fastened to a stator lamination 38 with separate fastening means. However, it is also possible, for example, to provide only one fastening opening 36, as shown in FIG. 4, for example in order to fasten the sensor fastening means 10 with fastening means already provided for fastening the electric machine to a mounting. The waste in the manufacture of the retaining plate 16 can be reduced as a result. The retaining plate 16 also has angled projections 40 spaced apart from one another.

Figure 5:
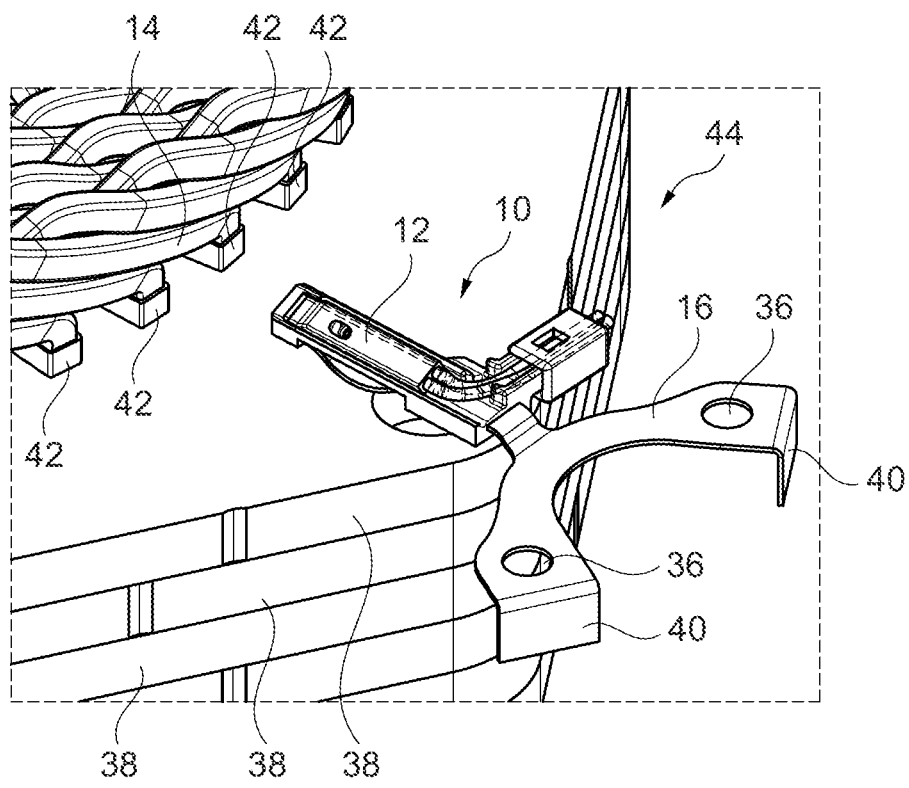
FIG. 5: shows a schematic perspective view of the sensor fastening means from FIG. 3 with a fully assembled temperature sensor during insertion into an electric machine

As illustrated in FIG. 5, the projections 40 can impact on different sides of the stator lamination 38 in order to limit the insertion depth of the sensor fastening means 10 to define the designated end position and to prevent rotation. The winding 14 of the stator is spaced apart from the stator laminations 38 by insulating elements 42 running in the radial direction. A relative movement of the sensor fastening means 10 in the radial direction of the electric machine allows the entrained temperature sensor 12 to be threaded into a winding groove opening provided in the circumferential direction between two consecutive insulation elements 42 and pushed axially into the winding 14.

Figure 6:
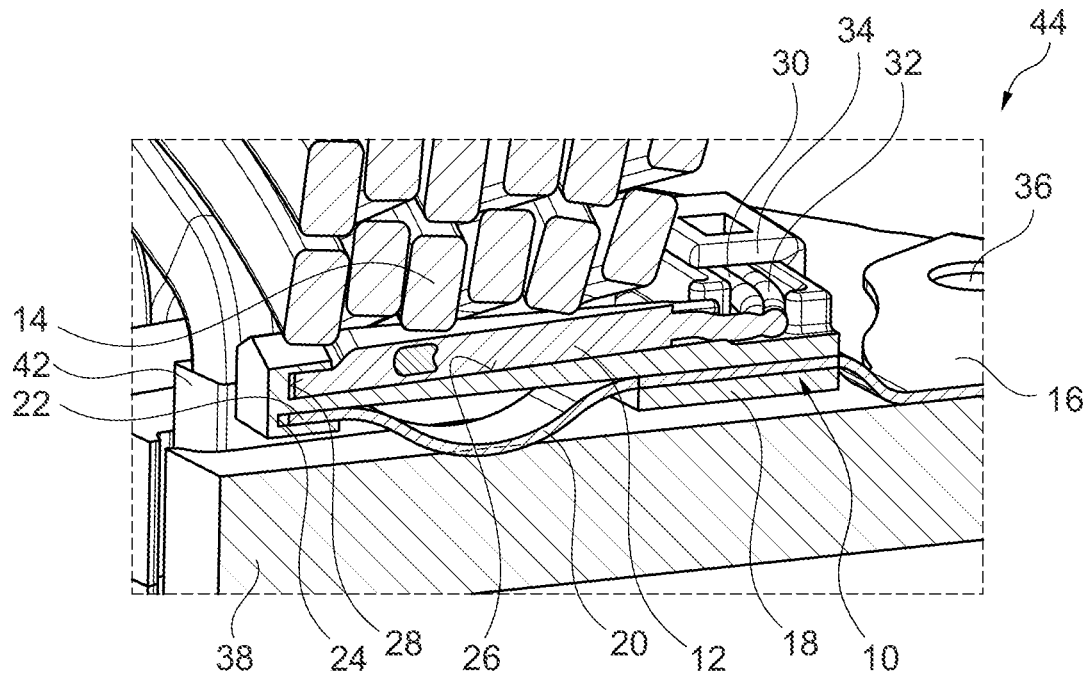
FIG. 6: shows a schematic perspective sectional view of the sensor fastening means from FIG. 5 in the inserted state.

As illustrated in FIG. 6, the spring element 20 can push the sensor fastening means 10 away from the stator lamination 38, in doing so pressing the sensor element 12 against a radially inner edge region of winding 14, where the highest temperature is to be expected during operation. This results in a thermal connection between the temperature sensor 12 and the winding 14, which is not affected by an intermediate thermal insulation layer in between. In addition, the temperature sensor 12 is protected from other media in the intermediate space between the insulation elements 42 and between the winding 14 and the stator lamination 38, so that, for example, impairment of the temperature measurement by forced convective heat dissipation is avoided. The stator of the electric machine, composed of the winding 14, the insulation elements 42 and the stator laminations 38, together with the sensor fastening means 10 and the temperature sensor 12, form a stator assembly 44 which can act together as a common assembly with a rotor of the electric machine, which is not shown. Here, the sensor fastening means 10 can very easily be disassembled for maintenance purposes, for example to replace a defective temperature sensor 12, and reassembled once more.

LIST OF REFERENCE SYMBOLS

10 Sensor fastening means
12 Temperature sensor
14 Winding
16 Retaining plate
18 Retaining body
20 Spring element
22 Free end
24 Receiving pocket
26 Receiving shaft
28 Retaining pocket
30 Cable shaft
32 Electrical line
34 Clamping element
36 Fastening opening
38 Stator lamination
40 Projection
42 Insulation element
44 Stator arrangement

The invention claimed is:

1. A sensor fastening means for temperature measurement in an electric machine for driving a motor vehicle, comprising:
a retaining body for accommodating a temperature sensor,
a metal retaining plate fastened to the retaining body for fastening to the electric machine in a defined installation position relative to the electric machine, with, in the installation position, the temperature sensor being oriented substantially in a radial direction of the electric machine, and
a spring element supported on the retaining body for providing a spring prestressing in an axial direction for pressing the temperature sensor against a radially inner edge of a winding.

2. The sensor fastening means according to claim 1, wherein the temperature sensor is accommodated in the retaining body so that it cannot move in the axial direction and a tangential direction.

3. The sensor fastening means according to claim 1, wherein the spring element is designed as a single piece with the retaining plate.

4. The sensor fastening means according to claim 1, wherein the spring element is designed as a leaf spring.

5. The sensor fastening means according to claim 1, wherein a free end of the spring element is accommodated in a receiving pocket of the retaining body so that it can be moved relatively in the radial direction of the electric machine.

6. The sensor fastening means according to claim 1, wherein the retaining body has a receiving shaft for inserting the temperature sensor through a relative movement in the radial direction of the electric machine, wherein a cable shaft for accommodating electrical lines of the temperature sensor is directed at an angle away from the receiving shaft.

7. The sensor fastening means according to claim 6, wherein the receiving shaft has a retaining pocket for accommodating a free end of the temperature sensor, wherein the retaining pocket blocks a relative movement of the temperature sensor to the retaining body in at least one of the axial direction and a tangential direction of the electric machine.

8. The sensor fastening means according to claim 1, wherein the retaining plate has at least one fastening opening for fastening to a stator lamination of the electric machine.

9. The sensor fastening means according to claim 1, wherein the retaining plate has at least one angled projection for at least one of limiting a radial insertion depth and preventing rotation.

10. A stator arrangement for an electric machine having at least one stator lamination, a winding for forming an electromagnet, insulation elements provided between the stator lamination and the winding and arranged spaced apart from one another in a circumferential direction for electrically insulating the winding with respect to the stator lamination, and a sensor fastening means according to claim 1, fastened to the stator lamination, wherein the temperature sensor accommodated in the retaining body extends substantially radially between two insulation elements following one another in the circumferential direction and is pressed in a thermally conductive manner against the winding by the spring element supported on the stator lamination.

11. The sensor fastening means according to claim 6, wherein the angle is substantially 90°±10°.

12. The stator arrangement according to claim 10, wherein the temperature sensor is pressed in the thermally conductive manner against a radially inner edge of the winding by the spring element.

\* \* \* \* \*